May 14, 1957 A. A. ESPARI ET AL 2,791,823
ROD-SAWING MACHINE
Filed Oct. 29, 1953 6 Sheets-Sheet 3

INVENTORS
A. A. Espari
L. J. Paffumi
BY Rosenblett Bartholow
ATTORNEYS

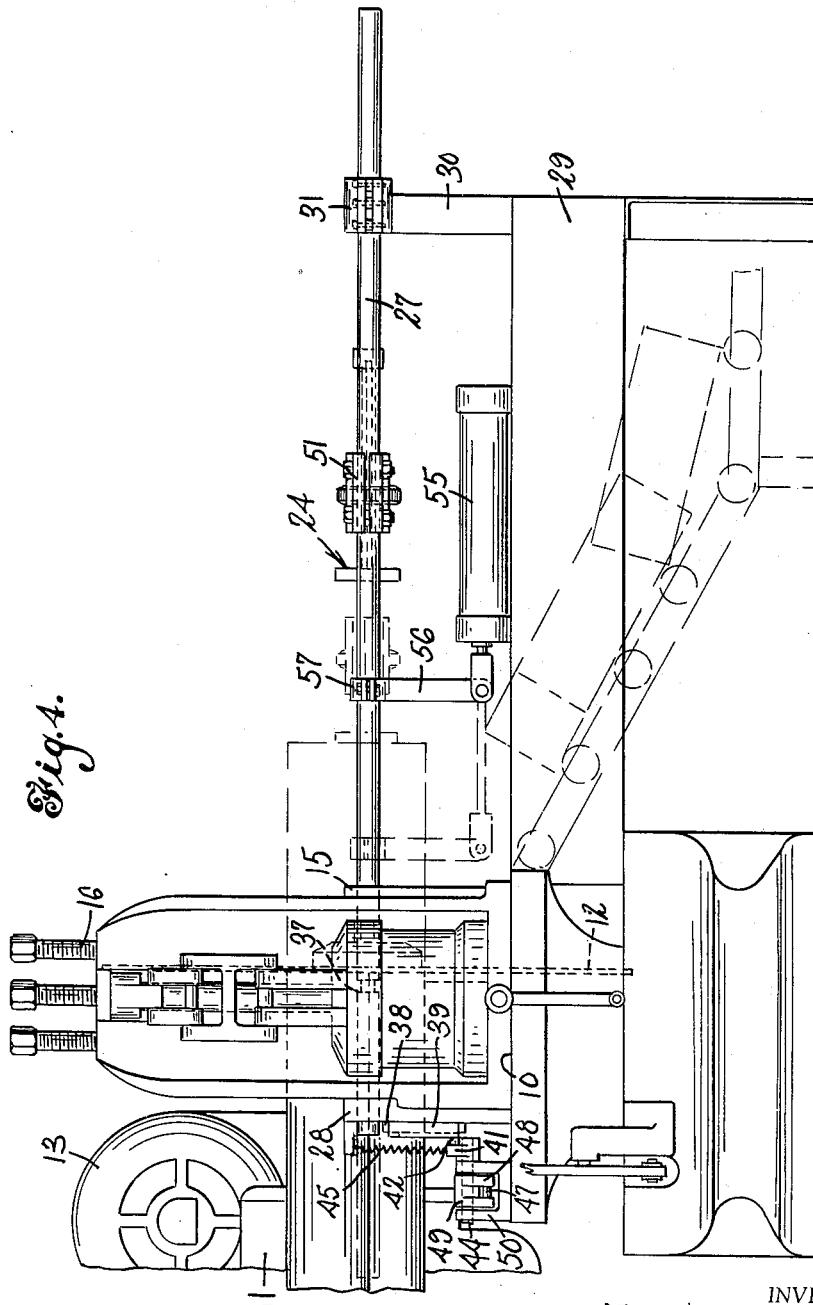

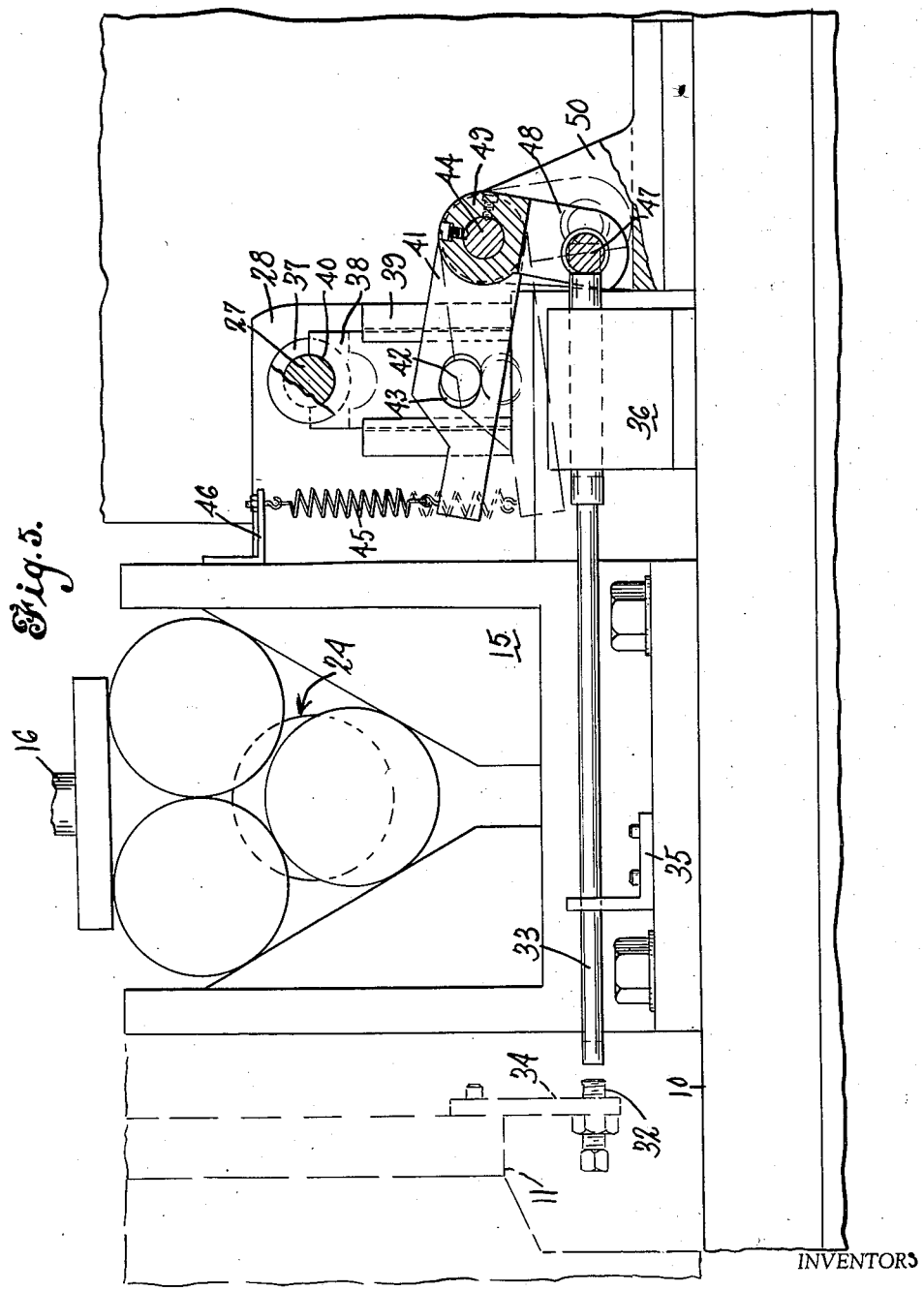

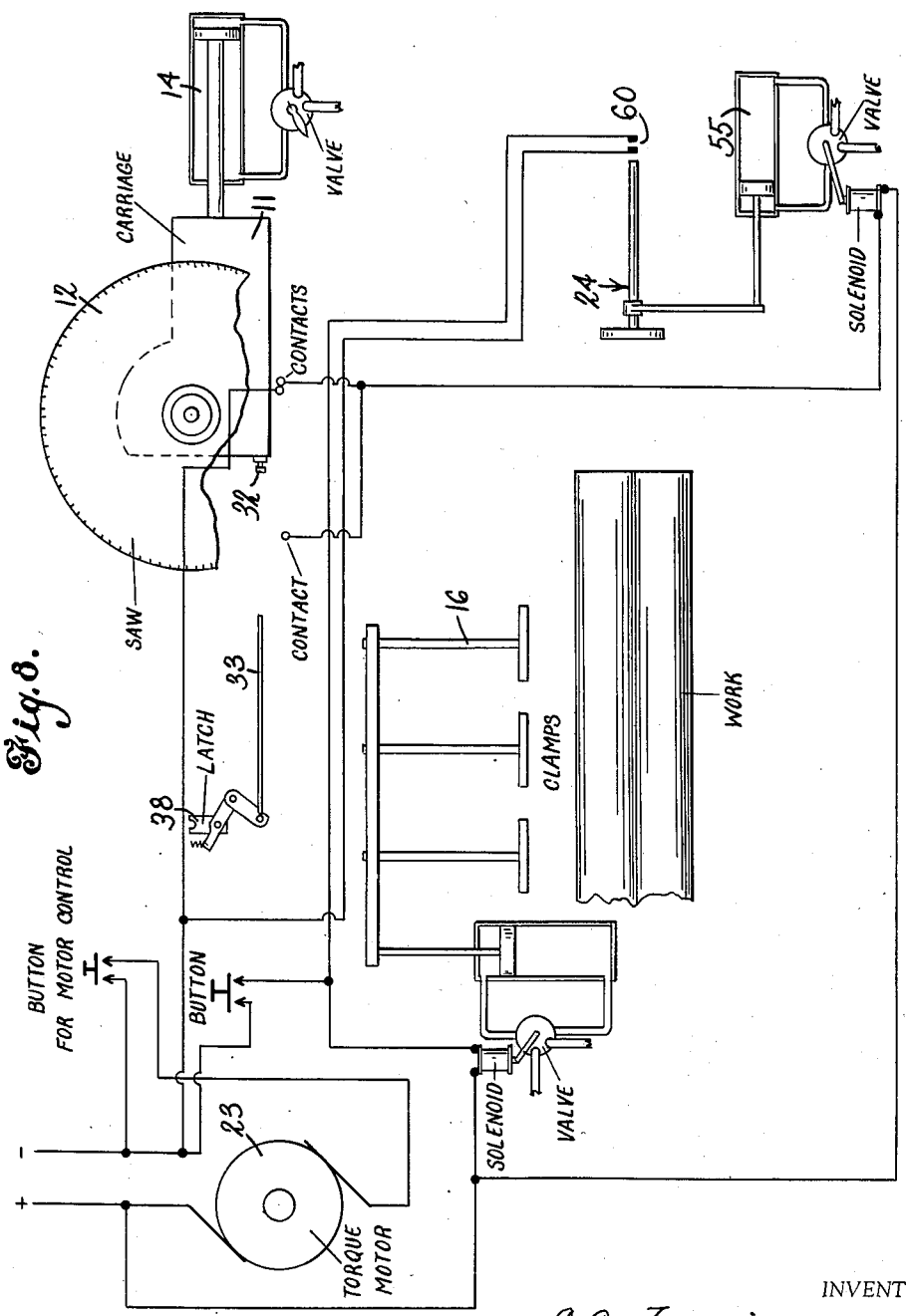

United States Patent Office 2,791,823
Patented May 14, 1957

2,791,823

ROD-SAWING MACHINE

Alphonse A. Espari, Hamden, and Louis J. Paffumi, New Haven, Conn., assignors to Interstate Manufacturing Corporation, Orange, Conn., a corporation of Connecticut Application October 29, 1953, Serial No. 388,978

5 Claims. (Cl. 29—69)

This invention relates to cold-metal sawing machines of the type in which relatively long rods or bars, fed forward to the saw in a stepwise manner, are sawed into a number of short pieces.

The machine is of a type in which a rotary saw is mounted for reciprocation toward and away from the work, the workpiece or pieces being held stationary while the saw is cutting, and then being released and fed forwardly again for another cutting operation.

The invention is particularly concerned with the gauging means by which the forward feed of the rod or rods to the saw is caused to be stopped at the proper point.

An object of the present invention is to provide improved gauging mechanism which operates precisely and effectively in gauging the stock and is of relatively simple structure.

Another object of the invention is to provide a rod-sawing machine having a stop for the feeding mechanism which is constructed and located in an improved manner relatively to the other parts of the machine.

Another purpose of the invention is to provide a feeding stop or gauge mounted in such a manner that it will not interfere with the discharge from the machine of the completely severed workpieces.

A still further object is to provide a machine of this type, in which the feed-stop mechanism is readily adjustable to adapt it to the cutting off of workpieces in a variety of different lengths.

In the accompanying drawings:

Fig. 3A is a fragmentary view showing certain parts illustrated in Fig. 3, the saw carriage being in the cutting position and the feed-stop member being in a position where it is at some distance from the forward ends of the rods;

Fig. 4 is an elevation on a larger scale of certain parts shown in Fig. 1, the feed-stop mechanism being shown in full lines in the same position shown in full lines in Fig. 3A;

Fig. 5 is an enlarged section on line 5—5 of Fig. 1;

Fig. 6 is a detail, partly in longitudinal section, of the movable stop member engageable by the ends of the rods;

Fig. 8 is a diagram showing the operating controls of the machine.

Figure 1:
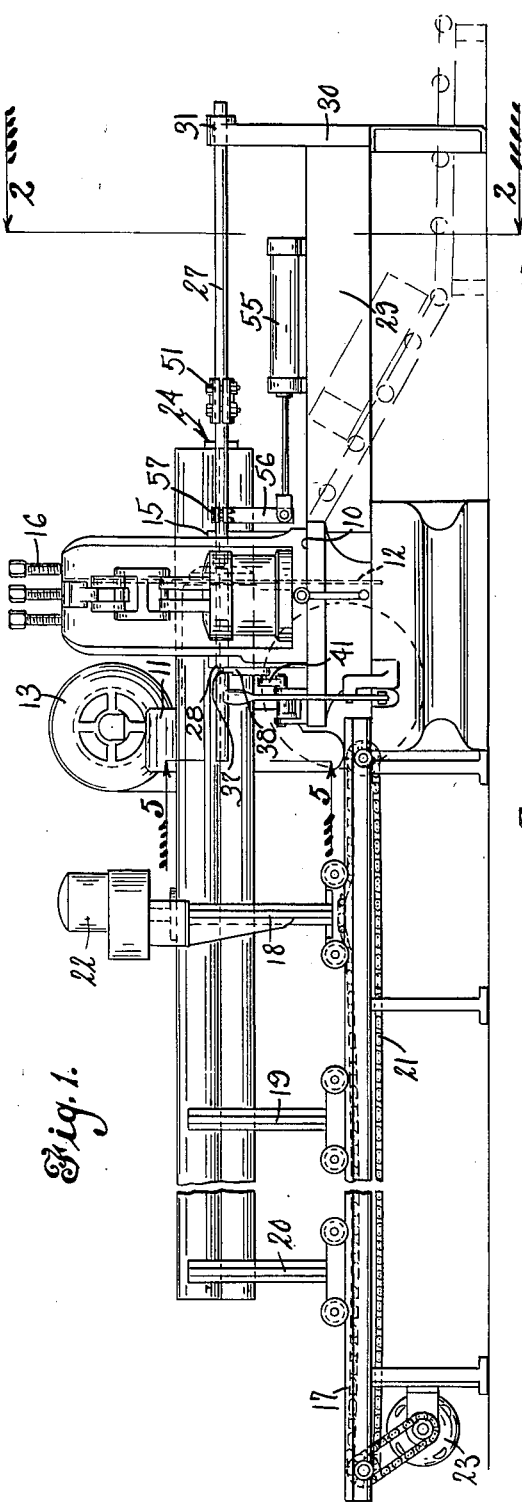
Fig. 1 is a side elevation of a rod-sawing machine embodying our invention, this machine being of a type to handle a number of rods at the same time, and the machine being in a position preliminary to feeding the saw toward the work.
Figure 2:
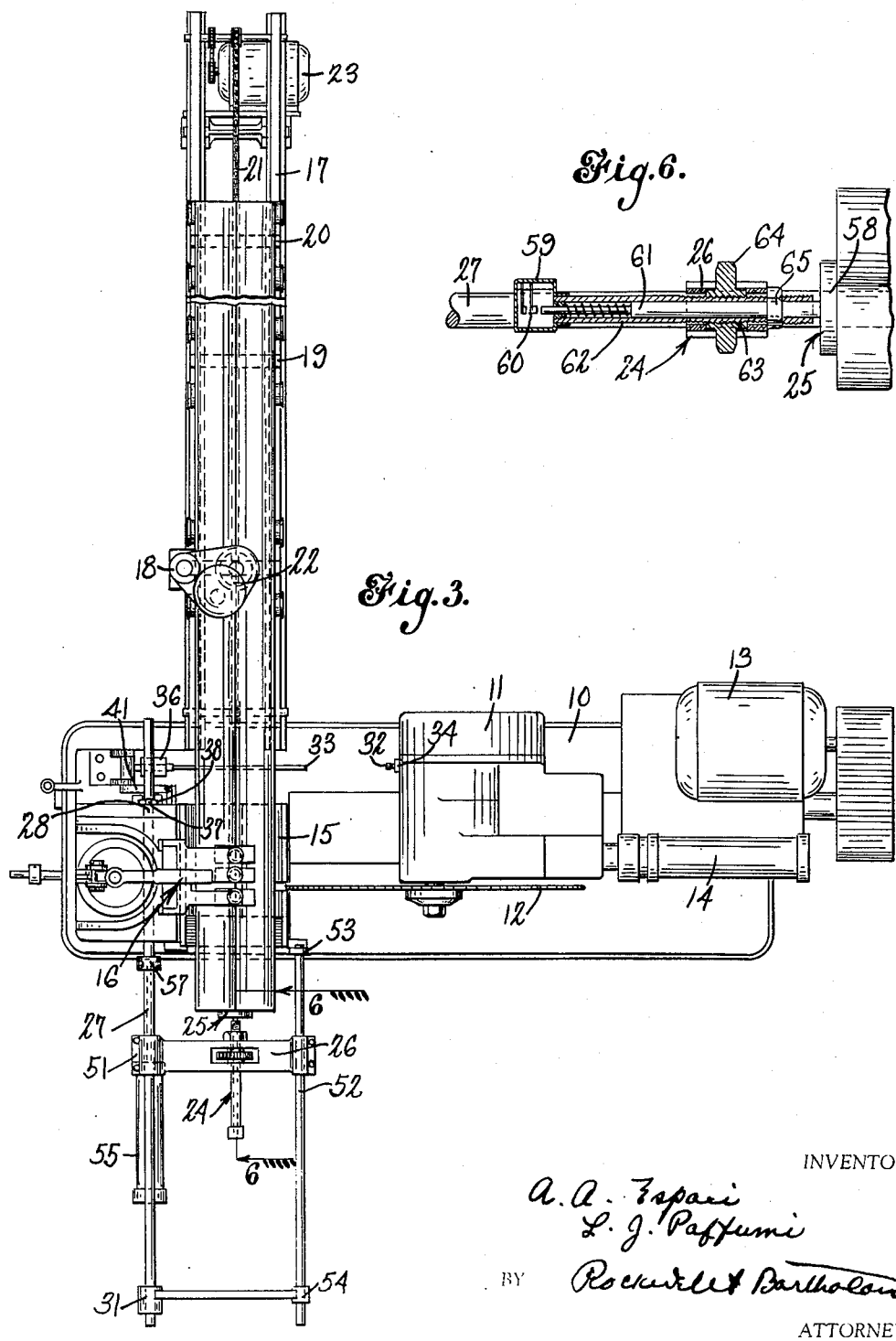
Fig. 2 is a section on line 2—2 of Fig. 1.

The machine illustrated in the drawings by way of example is one in which a carriage for a rotary saw is reciprocably mounted upon an elongated bed, the arrangement being such that the saw blade can be advanced through end portions of several long rods or bars which are fed forwardly at right angles to the direction of feed of the saw blade. The saw blade is rotated in any suitable manner by an electric motor, and the saw carriage is advanced and retracted by suitable means, such as an hydraulic cylinder and piston. The rods are held in a vise or clamp on the elongated bed and are clamped in the vise by a number of clamps which are operated by hydraulic mechanism of a known kind. The long rods are carried in locations rearwardly of the sawing point by suitable means such as trucks provided with V blocks receiving the rods at intervals, the rods being clamped to one or more of these trucks. In the case shown, the trucks travel on elevated track and one or more of the trucks are advanced toward the sawing point by an endless feed chain which is driven by a torque motor, the effect of which is to force the rods at the correct speed toward the sawing point. In the example shown, one of the trucks (which is fastened to the feed chain) is provided with a motor-operated clamp acting to hold all of the rods firmly in the V block of this truck.

The feeding track just referred to may be said to be located at the rear of the elongated bed on which the saw carriage is mounted. The pieces cut off by the saw drop from the holding vise at the forward side of the bed as the ends of the rods in the sawing position overhang the forward edge of the bed. The feed-stop mechanism shown involves a slidable stock-engaging member having a rear end in the form of a pad engageable by the forward ends of the rods. This member is adapted to close an electrical circuit in the manner hereinafter described, and it is mounted, in this particular case, on a transverse element in the nature of a strap fixed to a longitudinally sliding member that is guided in a direction parallel to the feed movement of the work. This longitudinally sliding member is normally locked against movement so that the work-engaging member or stop is held in a fixed position, but the arrangement is such that, when the saw blade is advanced to a predetermined position relatively to the work, the sliding member, together with its connected work-engaging member, is released, as hereinafter described, so that the work-engaging member can be moved out of its fixed position to a location in which it will be out of the way of the workpieces which are about to drop out of the vise.

In the drawings, the elongated bed on which the saw carriage is mounted is indicated at 10, the saw carriage at 11, the rotary saw at 12, the electric motor for rotating the saw at 13, and the hydraulic cylinder and piston for shifting the carriage at 14. The vise or holder on the elongated bed is indicated at 15, the hydraulically operated clamping mechanism associated therewith is indicated at 16, and the raised track at the rear of the bed at 17. Three trucks, traveling on the track and supporting the rods, are indicated respectively at 18, 19 and 20, each being provided with a V block supporting portions of the rods. The truck 18 is fixed to an endless chain 21 and is equipped with a motor-operated device, generally indicated at 22, for clamping the rods firmly in the V block of this truck. The endless chain 21 is moved in this particular case by a torque motor 23 located adjacent the rear end of the elevated structure on which the rails of the track 17 are supported.

The feed-stop mechanism is located in part forwardly of the bed 10, and this mechanism is generally indicated at 24. The slidable stock-engaging member is indicated at 25, and the transverse supporting element or strap at 26. The longitudinally sliding member is indicated at 27, this being in the form of a rod guided in a forward and rearward direction at the side of the work which is opposite the saw, in a suitable mounting on the bed, indicated at 28.

Figure 7:
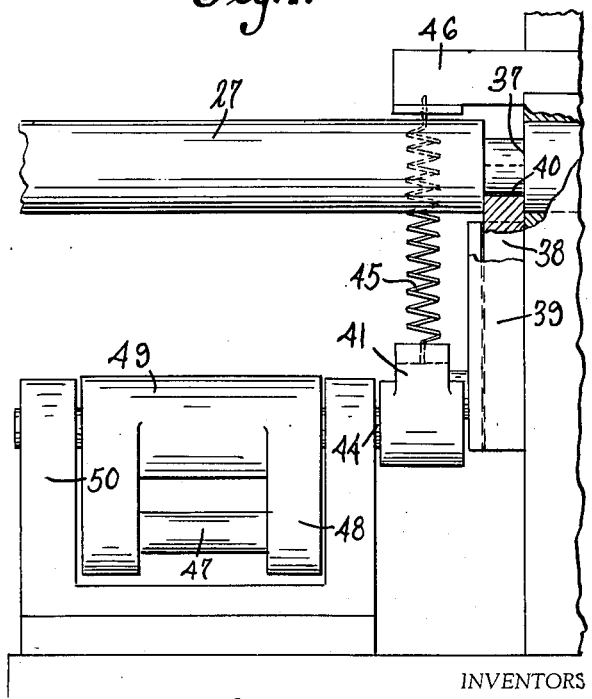
Fig. 7 is a fragmentary elevation, partly in section, of the means for locking and releasing the sliding rod member which carries the stock-engaging member of the gauging mechanism.

At the front of the bed there is arranged an elevated frame member 29 which extends forwardly from a point adjacent the vise 15, and has a part 30 rising from it in which is slidably mounted the forward end portion of the sliding member 27, the part 30 being provided with a bearing 31 for this member. The saw carriage 11 is equipped with an adjustable contact member 32 which moves toward the work as the saw is advanced toward the work, and this contact member at a certain point in the saw-carriage movement is adapted to contact and shift a rod-like member 33 horizontally disposed and slidably mounted on the bed at the rear of the vise 15. The adjustable contact member carried by the saw carriage may be in the form of a bolt adjustably mounted in a carrying bracket 34, as indicated by the dotted lines in Fig. 5. This bolt is adapted to engage the end of the rod 33 to push this rod lengthwise. The rod 33 is slidably mounted in a bracket 35 and in a bearing member 36, as best shown in Fig. 5. The slidable rod member 27 is provided, in a location spaced forwardly from its rear end, with a transverse groove 37, as best shown in Fig. 7, this groove being engageable by a vertically sliding member 38 mounted in a guideway 39 below the rod 27. The slide 38 is formed at its upper end with a semicircular recess 40 adapted to conform to the rod 27 in the grooved part 37, and when this occurs the rod 27 is locked against endwise movement. The slide 38 is connected at its lower part to a lever 41 by a pin 42 on the slide engaging a slot 43 in the lever, said lever being fixed in position on a rock shaft 44, the axis of which is parallel to the rod 27. Means such as a spring 45, connected at one end to the lever 41 and at the other end to a fixed bracket 46, normally holds the lever 41 in the elevated position shown in Fig. 5, causing the slide 38 to be engaged with the rod 27 to lock it against movement. However, by movement of rod 33 to the right (Fig. 5), slide 38 can be moved to releasing position. In the case shown, this is brought about by engagement of the right-hand end (Fig. 5) of rod 33 with a pin 47 mounted in the fork 48 of a lever 49, which, like lever 41, has a pivoting axis provided by the shaft or rod 44. The rod 44 is mounted for rocking movement in a bearing bracket 50, as shown in Fig. 7, the lever 49 being received in this bracket and the lever 41 being fixed to the rocking rod or shaft 44 forwardly of the bracket.

Figure 3:
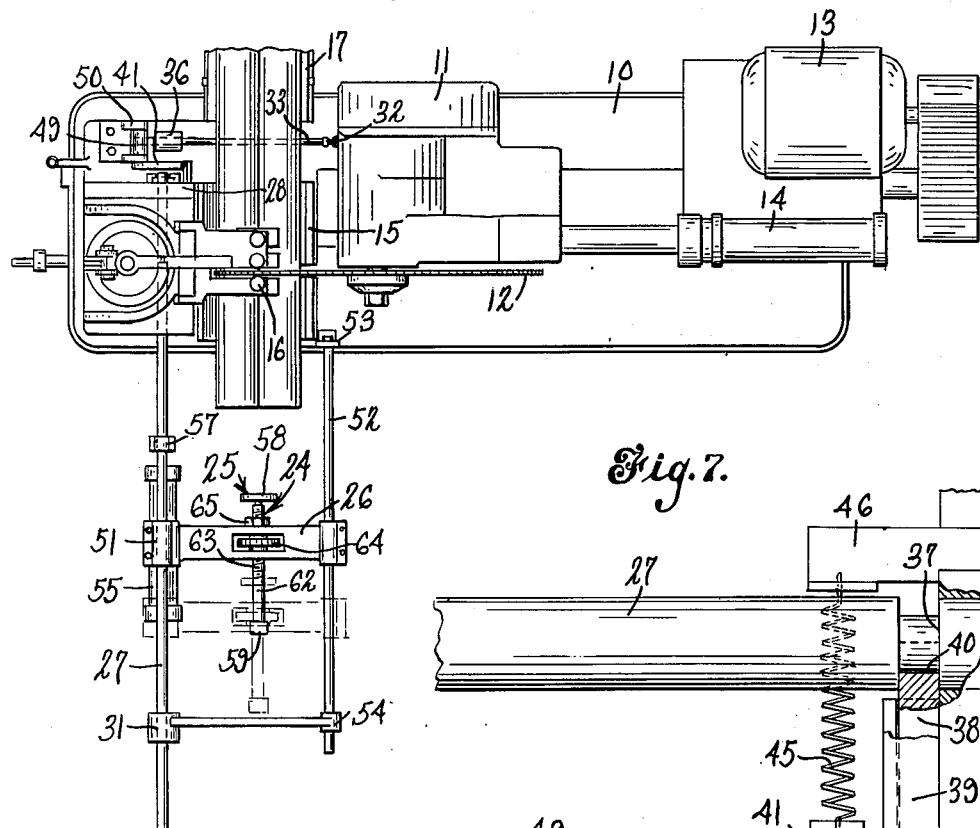
Fig. 3 is a top plan view of the machine with the parts in the positions shown in Fig. 1.

The transverse element or strap 26 has the work-engaging member 25 mounted therein in a cut-away portion at the middle of the strap or element, as shown in Figs. 3 and 6. At one end of the strap the same is provided with a clamping portion 51 divided into parts which are held together by bolts to engage the rod 27 securely so that, as the rod is moved, the strap moves with it. At the opposite end of the strap the latter has a sliding engagement with a stationary guide element 52, which is a rod fixed on the machine bed at 53 and extending forwardly from the bed parallel to the sliding rod 27. The forward extremity of the guide rod 52 is suitably fixed in position at 54 by a member in fixed relationship to the frame part 30. Beneath the sliding rod 27 a suitable fluid-pressure device, shown at 55, is suitably mounted on the supporting frame, the same comprising a cylinder and piston which in this case is in a vertical plane below the rod 27. This device 55 is used for shifting the rod 27 with the member 25 forwardly and rearwardly. In the case shown, the piston of the device 55 is connected to an upwardly extended arm 56, the upper end of which is clamped about the rod 27 at 57. By the arrangement shown, the movement of the piston in one direction will move the rod 27 forwardly, and a reverse movement will move it rearwardly, as indicated by the dotted lines in Fig. 4.

The work-engaging member 25 used in gauging is a stem-like member having a work-engaging disk or pad 58 at the rear end, said pad being engageable with the ends of all of the rods fed forwardly. At the forward end of this stemlike member is a small chamber 59 containing a pair of contacts 60 arranged to be brought together to complete an electrical circuit controlling the clamping mechanism for the work. The circuit-closing member is a spring-biased plunger 61 forming a part of the work-engaging member. The plunger 61 is slidable in a tubelike casing 62 having external threads which are engaged by an adjusting nut 63 having a manipulating rim 64. A lock nut 65 holds the tube 62 in the adjusted position relatively to the strap member 26. When the strap member is locked against longitudinal movement, impingement of the rod ends upon the pad 58 and a slight forward movement of the pad will cause the plunger 61 to be moved forwardly to the circuit-closing position while the remainder of the gauging member remains stationary.

The clamping mechanism 16, for clamping the rods in the vise or holder 15, comprises in this particular case three adjustable clamping members adapted to press down upon the rods from above, two of these members being rearwardly of the plane of the saw cut and the other member being forwardly thereof. These members may be operated sequentially or in any preferred manner.

The cut-off workpieces dropping out of the vise or work holder 15 after the release of the clamp located forwardly of the saw cut, will drop down to be discharged, and, if desired, a ramp can be provided over which the pieces slide, as indicated by the broken lines in Figs. 1 and 4.

In the operation of the machine, it will be understood that, when the forward ends of the rods approach the pad of the work-engaging member, the latter member will be fixedly held in position by the strap 26 fixed to the sliding rod 27, which sliding rod 27 at that time will be effectively locked against endwise movement by the locking or latching device, previously described, which, at this time has the upper end of its upright slide member engaged in the groove of the sliding latching rod. However, at an appropriate point in the operation of the saw, the latching device will be released by the contacting of the contact member 32 with the transverse releasing rod 33, which operates in the manner previously described. This causes release of the rod 27 and of the gauging member carried thereby, so that the gauging member with its carrying strap 26 can be moved out of the way of the dropping workpieces by actuation of the hydraulic device 55. However, the saw carriage being withdrawn from the work and the gauge being moved back to its initial position, the gauge will be again locked against endwise movement by the action of the spring 45, which moves the locking slide 38 to the locking position and restores the releasing or actuating rod 33 to its initial position.

It will be apparent that the hydraulic device 55 can be operated to move the gauging member to the fixed working position where it will be engaged by the work, and to the inoperative position where it will be out of the way of the dropping piece or pieces. It is apparent, of course, that where the length of the piece or pieces cut off is changed, it is necessary to shift the position of the work-engaging member relatively to its carrying rod. This may be readily done by loosening the clamp, shifting the strap along the rod, and reclamping it. In Fig. 3A, one position of the strap member is shown in full lines and another position in broken lines.

In operating machines of the kind shown herein, the different operations involved in cutting the long rods or bars into a number of pieces can be effected in a fully automatic manner, or semiautomatically. The mechanism shown herein is adapted for operation in either of these ways. At the start of the operation the rods are placed in the clamping means provided in connection with the vise or holder and the following truck or trucks, the clamps in association with the vise being in the released position, the gauging member being in the desired stationary position for gauging, and the longitudinal sliding rod, which is a carrier for the gauging means, being in the locked position. The torque motor, of course, has a suitable control. In semiautomatic operation, a pushbutton controlling the torque motor may be used, and the operation is controlled so that at the proper time the vise is closed to clamp the work, the torque motor then cut out, and the saw carriage moved toward the work to saw off the pieces. From this point on, the operation is essentially as described above.

In the diagram of Fig. 8 the principal parts of the machine are shown diagrammatically, together with the principal controls, and for simplification of the disclosure it is directed to a machine operated semiautomatically. This diagram shows the saw carriage and the latch controlled by the movement of the carriage, although the latch is shown in a conventional manner. It shows also the torque motor used for feeding the work, and in a diagrammatic manner it shows the clamps which hold the work in the main work holder or vise. It also shows in a schematic way the axially movable gauging element shiftable by an hydraulic device so that it can be moved out of the way of the sawed-off piece. In this diagram it was not considered necessary to show the details of the mounting of the gauging member, which details are illustrated in other views. The operation of the hydraulic device 55 is shown as being controlled from the movement of the saw carriage. Upon closing of the contacts 60 the clamping mechanism 16 is operated to clamp the work. In the diagram (Fig. 8) there is shown a pushbutton which can be used for releasing the clamps from the work.

It will be evident that the machine disclosed herein embodies an elongated bed on which a carriage for a rotary saw is reciprocable lengthwise, the bed being provided with a rod holder (having relatively fixed and movable clamping parts), the axis of which is transverse to the path of the saw, said work holder having in association therewith means at the rear portion of the bed for pressing or pushing the workpiece or pieces toward the sawing region of the holder where the work can be sawed the feed of the work is arrested. Substantially parallel to the holder is a longitudinally movable member having a rigid lateral connection with the gauging member, the latter having a lost-motion connection therein permitting a slight amount of travel of one element thereof before the electric circuit employed in connection with the gauging device is closed. The longitudinally moving gauge-carrying member is provided with means intermediate of its ends engageable with a laterally (upwardly) movable latching member held in fixed position during the advance of the work but releasable automatically when the saw reaches a predetermined position in its movement in the direction of the work. Slightly before the moment when the sawed-off workpiece or pieces in the holder are released, the gauge-carrying member is released so that its shifting means can shift it out of the way of the workpiece or pieces being discharged from the holder. The transverse member which carries the gauging member is effectively supported and guided at its respective ends for rectilinear movement, and the gauging member and its appurtenant parts are in a location where they are very readily accessible for adjustment.

The disclosure herein is by way of example only and it is to be understood that various modifications and changes in the details can be made without departure from the principles of the invention or the scope of the claims.

What we claim is:

1. In a machine such as described, the combination of a bed, a carriage carrying a rotary saw reciprocable on said bed, a work holder with clamping means for work in rod form located on the bed and toward which the saw is movable and from which the severed workpieces drop, means rearwardly of the bed for holding the work and feeding it forwardly toward the work holder, a gauging member to be impinged by the forward end of the workpiece located forwardly of the work holder in a location where the severed workpiece is to drop from the work holder, a carrier slidable forwardly and rearwardly substantially parallel to the feeding direction of the work and carrying said gauging member, said gauging member being adjustably and slidably mounted on said carrier for adjustment toward and away from said work holder, means for moving said carrier, and latching means for said carrier controlled by the movement of said carriage which holds said carrier normally in axially fixed position but releases it at a predetermined stage of the operation so that the carrier may shift the gauging member out of the way of the severed workpiece, said carrier being in the form of a rod slidably mounted at one side of said work holder and having means intermediate of its ends cooperating with said latching means.

2. In a machine such as described, the combination of a bed, a carriage carrying a rotary saw reciprocable on said bed, a work holder and clamping means for work in rod form located on the bed and toward which the saw is movable, the work holder being located so that a severed workpiece can drop from the work holder adjacent a forward edge portion of the bed, means rearwardly of the bed for holding the work and feeding it forwardly toward the work holder, a gauging member to be impinged by the forward end of the workpiece located forwardly of the work holder in a location where it would normally be in the path of a falling severed workpiece, a carrier mounted for sliding movement in a forward direction supporting said gauging member, said gauging member being adjustably and slidably mounted on said carrier for adjustment toward and away from said work holder, means for moving said carrier to move the gauging member toward and away from the work holder, and latching means for said carrier controlled by the movement of said carriage holding said carrier and said gauging member in gauging position but releasable so that the gauging member can be shifted out of the way of the severed workpiece.

3. In a machine such as described, a bed, a saw-equipped carriage reciprocable on said bed, a work holder on said bed toward which the saw is movable, means for feeding the work forwardly toward the work holder, a gauging member adjacent the work holder adapted to be impinged by the forward end of the workpiece, a sliding rod serving as a carrier for said gauging member adapted to move the gauging member toward and from the work holder, said gauging member being adjustably and slidably mounted on said rod for adjustment toward and away from said work holder, a latching member co-acting with said rod intermediate of the ends of the rod adapted to hold said rod in a fixed axial position, said latching member being biased to latching position, power means for moving said rod in opposite directions when released, and a releasing rod for releasing said latching member movable by the saw carriage when the latter reaches a predetermined position so that the gauging member may be shifted out of the way of the severed workpiece, said latching member comprising a slide engageable with and disengageable from a transverse groove in the gauging-member-carrying rod.

4. In a machine such as described, the combination of a bed, a carriage carrying a rotary saw reciprocable on said bed, a work holder for clamping work in rod form and located on the bed, the saw carriage being movable toward and away from the work holder from which the severed work pieces drop, means rearwardly of the work holder for feeding the work forwardly toward the latter, gauging means to be impinged by the forward end of the work and located forwardly of the work holder and slidable toward and away from the latter, the gauging means being slidable away from the work holder to clear the work pieces after severance of the latter, power-operated means for moving said gauging means toward and away from the work holder, and latching means for the gauging means and controlled by the movement of said carriage to hold the gauging means in gauging position, the latching means being releasable after severance of the work pieces so the gauging means may be shifted to clear the work pieces.

5. In a machine such as described, the combination of a bed, a carriage carrying a rotary saw reciprocable on said bed, a work holder for clamping work in rod form and located on the bed, the saw carriage being movable toward and away from the work holder from which the severed work pieces drop, means rearwardly of the work holder for feeding the work forwardly toward the latter, a gauging member to be impinged by the forward end of the work and located forwardly of the work holder in the region where the severed workpiece is to drop from the work holder, a carrier located forwardly of the work holder and sidable forward and away from the latter and carrying the gauging member, the carriage being slidable away from the holder to clear the gauging member from the work pieces after severance of the latter, power-operated means for moving the carrier toward and away from the work holder, and latching means for the carrier controlled by the movement of said carriage to hold the carrier in gauging position, the latching means being releasable after severance of the work pieces so that the carrier may be shifted to clear the gauging member from the work piece.

References Cited in the file of this patent

UNITED STATES PATENTS

| 2,351,962 | Harrison | June 20, 1944 |
| 2,711,006 | Abbey | June 21, 1955 |

FOREIGN PATENTS

| 463,312 | Great Britain | Mar. 19, 1937 |